(12) United States Patent
Nishida et al.

(10) Patent No.: US 10,585,426 B2
(45) Date of Patent: Mar. 10, 2020

(54) PRODUCTION MANAGEMENT DEVICE AND PRODUCTION STATUS DISPLAY METHOD

(71) Applicant: Panasonic Intellectual Property Management Co., Ltd., Osaka (JP)

(72) Inventors: Hiroyoshi Nishida, Yamanashi (JP); Akihito Yamasaki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/871,352

(22) Filed: Jan. 15, 2018

(65) Prior Publication Data

US 2018/0217582 A1 Aug. 2, 2018

(30) Foreign Application Priority Data

Feb. 2, 2017 (JP) .................................. 2017-017343

(51) Int. Cl.
*G05B 19/418* (2006.01)
(52) U.S. Cl.
CPC ...... *G05B 19/4188* (2013.01); *G05B 19/41865* (2013.01); *G05B 2219/31001* (2013.01);
(Continued)
(58) Field of Classification Search
CPC .......... G05B 19/41865; G05B 19/4188; G05B 2219/31001; G05B 2219/45031; Y02P 90/02; Y02P 90/30
See application file for complete search history.

(56) References Cited

U.S. PATENT DOCUMENTS

| 6,480,756 B1 * | 11/2002 | Luh | ............... G05B 19/4183 700/100 |
| 2006/0036498 A1 * | 2/2006 | Iida | ............... G05B 19/41865 705/15 |

(Continued)

FOREIGN PATENT DOCUMENTS

| JP | H07-182421 A | 7/1995 |
| JP | H07-251356 A | 10/1995 |

(Continued)

*Primary Examiner* — Yuhui R Pan
(74) *Attorney, Agent, or Firm* — Pearne & Gordon LLP (57) ABSTRACT

A management computer (equipment information acquisition unit) includes an equipment information acquisition unit that acquires production information from a plurality of pieces of production equipment and a display that displays a production status of a production line (component mounting line) and manages the production status of the production line where a work (board) is operated with a plurality of pieces of production equipment in order to produce a product (mounting board). Then, the display displays a plurality of equipment information sections respectively displaying the equipment information of a plurality of pieces of production equipment in order according to the production order and further displays the number of stocks of the work in a corresponding one of the plurality of pieces of production equipment in each of the plurality of work information sections to be displayed for the plurality of pieces of production equipment.

2 Claims, 6 Drawing Sheets

(52) U.S. Cl.
CPC ..... *G05B 2219/45031* (2013.01); *Y02P 90/02* (2015.11); *Y02P 90/30* (2015.11)

(56) References Cited

U.S. PATENT DOCUMENTS

| | | | | |
|---|---|---|---|---|
| 2007/0270992 | A1* | 11/2007 | Nishida | H05K 13/0885 700/111 |
| 2010/0211429 | A1* | 8/2010 | Benson | B24C 9/00 700/174 |
| 2012/0158167 | A1* | 6/2012 | Lengyel | G06Q 10/06 700/101 |

FOREIGN PATENT DOCUMENTS

| | | |
|---|---|---|
| JP | H10-156673 A | 6/1998 |
| JP | H11-320345 A | 11/1999 |
| JP | 2004-039973 A | 2/2004 |
| JP | 2004-207762 A | 7/2004 |
| JP | 3616200 B2 | 2/2005 |
| JP | 2006-310750 A | 11/2006 |
| JP | 2009-054051 A | 3/2009 |
| JP | 2016-072380 A | 5/2016 |
| WO | 2012/035642 A1 | 3/2012 |

* cited by examiner

FIG. 6

PRODUCTION MANAGEMENT DEVICE AND PRODUCTION STATUS DISPLAY METHOD

BACKGROUND

1. Technical Field

The present disclosure relates to a production management device that manages a production status of a production line and a production status display method for displaying the production status of the production line.

2. Description of the Related Art

A product such as a mounting board on which a component is mounted is produced by a production line where a plurality of production steps are executed in order with a plurality of pieces of production equipment. In such a production line, a production management device that acquires production information from individual production equipment and manages a production status of the production line is known (for example, see Japanese Patent Unexamined Publication No. 2004-207762). The management device of the board assembly line disclosed in Japanese Patent Unexamined Publication No. 2004-207762 displays the information acquired from each piece of production equipment in tile form on a display

SUMMARY

The production management device of the present disclosure is a production management device for managing a production status of a production line for producing a product by operating a work with a plurality of pieces of production equipment in order that includes an equipment information acquisition unit that acquires production information from each of the plurality of pieces of production equipment and a display that displays a production status of the production line, in which the display displays a plurality of equipment information sections that display respective pieces of equipment information of the plurality of pieces of production equipment in order according to a production order and further displays the number of stocks of the work in a corresponding one of the plurality of pieces of production equipment in each of a plurality of work information sections to be respectively displayed for the plurality of pieces of production equipment.

According to an aspect of this disclosure, there is provided a production status display method for displaying a production status of a production line for producing a product by operating a work with a plurality of pieces of production equipment in order including an equipment information acquisition step of acquiring production information from each of the plurality of pieces of production equipment and a display step of displaying a plurality of equipment information sections that display respective pieces of equipment information of the plurality of pieces of production equipment in order according to a production order and further displaying the number of stocks of the work in a corresponding one of the plurality of pieces of production equipment in each of a plurality of work information sections to be respectively displayed for the plurality of pieces of production equipment on a display.

According to the present disclosure, it is possible for an operator to intuitively grasp the production status of the production line.

DETAILED DESCRIPTION

Prior to describing an embodiment, problems in the related art will be briefly described.

In the prior art including Japanese Patent Unexamined Publication No. 2004-207762, a production status of each piece of production equipment constituting a production line is displayed, but there is a problem that it is difficult to grasp a production status of the production line intuitively because it is not possible to recognize the production status where a plurality of pieces of production equipment interact with each other with the displayed information alone.

Therefore, the present disclosure aims to provide a production management device and a production status display method that allow an operator to intuitively grasp the production status of the production line.

Figure 1:
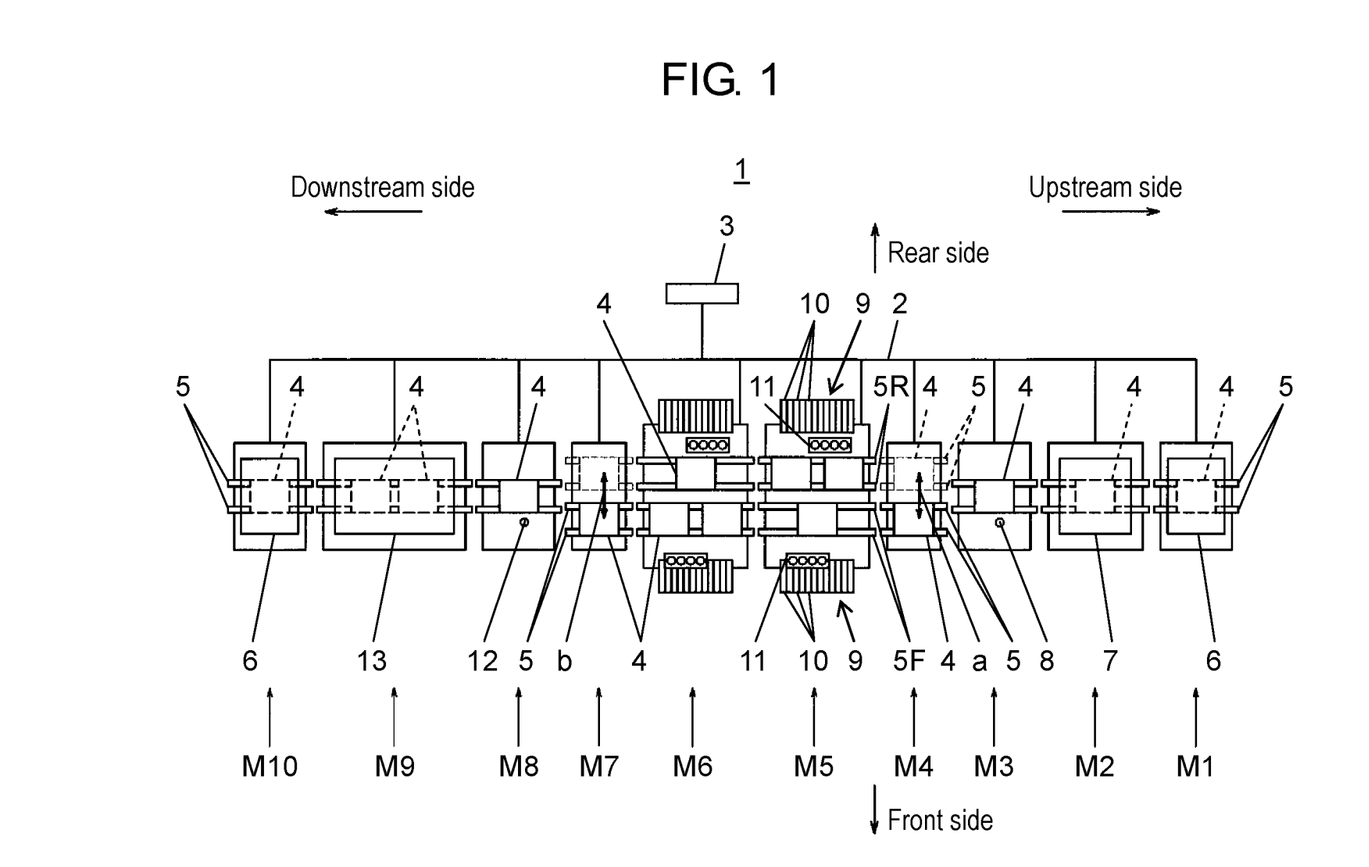
FIG. 1 is a configuration explanatory diagram of a component mounting line according to an embodiment of the present disclosure.

One embodiment of the present disclosure will be described in detail below with reference to drawings. The configurations, shapes, and the like described below are examples for description and may be appropriately changed according to a specification of a product and a production line. In the following description, as a production line, a component mounting line that produces a mounting board on which components are mounted on a board as a product will be described as an example. In the following description, the same reference numerals are given to the corresponding elements in all drawings, and redundant explanations are omitted. In FIG. 1, the right side of the page is referred to as an upstream side, the left side of the page is referred to as a downstream side, the lower side of the page is referred to as a front side, and the upper side of the page is referred to as a rear side.

First, referring to FIG. 1, a configuration of component mounting line 1 will be described. Component mounting line 1 is configured such that board supplier and storage M1, printer M2, printing inspection device M3, board distribution device M4, component mounter M5, component mounter M6, board distribution device M7, mounting inspection device M8, reflow device M9, and board supplier and storage M10, which are disposed from the upstream side to the downstream side, are connected by communication network 2 and the whole is controlled by management computer 3.

Here, in the following description, board supplier and storage M1, printer M2, printing inspection device M3, board distribution device M4, component mounter M5, component mounter M6, board distribution device M7, mounting inspection device M8, reflow device M9, board supplier and storage M10 are sometimes referred to as "devices M1 to M10".

Each of devices M1 to M10 includes transport lane 5 for transporting board 4. Transport lane 5 included in each devices M1 to M10 is connected to transport lane 5 of adjacent devices M1 to M10 to each other and transports board 4 to downstream devices M1 to M10 in order. The spacing of transport lane 5 is changed by a controller (see FIG. 2) included in each of devices M1 to M10 according to the size of board 4 to be transported.

Board suppliers and storages M1 and M10 include supply operation unit 23 (see FIG. 2) including a rack 6 storing a plurality of boards 4. Board suppliers and storages M1 and M10 execute a board supplying operation of supplying board 4 taken out from rack 6 by supply operation unit 23 to the downstream device. Alternatively, board suppliers and storages M1 and M10 execute a board storing operation of storing board 4 received from an upstream device in rack 6. Printer M2 includes printing operation unit 7 and executes a solder printing operation of printing (applying) solder to electrodes of board 4 carried in from the upstream side by printing operation unit 7 through a mask.

In FIG. 1, printing inspection device M3 includes printing inspection operation unit 43 (see FIG. 2) including solder inspection camera 8 that captures the solder printed on board 4. Printing inspection device M3 executes a printing inspection operation of inspecting a state of the solder printed on the board 4 by printing inspection operation unit 43.

Board distribution devices M4 and M7 include distribution operation unit 53 (see FIG. 2) that moves transport lane 5 in the front and rear (arrows a and b) between the front side and the rear side. Board distribution devices M4 and M7 receive board 4 from the upstream side by distribution operation unit 53 and transport board 4 to transport lane 5F on the front side of the downstream side or transport lane 5R on the rear side, or execute a board distribution operation of receiving board 4 from transport lane 5F on the front side of the upstream side or transport lane 5R on the rear side and transporting board 4 to the downstream side.

In FIG. 1, component mounters M5 and M6 include transport lane 5F on the front side and transport lane 5R on the rear side. Component suppliers 9 are respectively disposed on the outer side of transport lanes 5F and 5R. In component supplier 9, a plurality of tape feeders 10 arranged in a board transport direction are set. Tape feeder 10 feeds the components held on a carrier tape at a pitch and supplies the components to a pickup position by mounting head 11. Mounting head 11 moves in a horizontal direction by a head moving mechanism (not shown), respectively picks up the components supplied from component supplier 9 by suction nozzles, and mounts the components on board 4 positioned at mounting operation positions of transport lanes 5F and 5R.

That is, component mounters M5 and M6 (production equipment) include a plurality of operation positions. In addition, transport lanes 5F and 5R, component supplier 9, tape feeder 10, mounting head 11, and the head moving mechanism constitute mounting operation unit 63 (see FIG. 2). Component mounters M5 and M6 execute a component placement operation of placing a component by mounting operation unit 63 on board 4 on which solder is applied.

In FIG. 1, mounting inspection device M8 includes mounting inspection operation unit 73 (see FIG. 2) including component inspection camera 12 for capturing the components placed on board 4. Mounting inspection device M8 executes a mounting inspection operation of inspecting the state of the components placed on board 4 by mounting inspection operation unit 73. Reflow device M9 includes reflow operation unit 13 that heats while transporting board 4 within the device. Reflow device M9 heats board 4 on which the component is placed by reflow operation unit 13 to melt the solder and then, executes a reflow operation of solidifying the solder and soldering the component to board 4.

As described above, component mounting line 1 is constructed. Next, referring to FIG. 1, a procedure for producing a mounting board in component mounting line 1 will be described. First, board supplier and storage M1 (board supplying device) supplies board 4 stored in rack 6 to printer M2 on the downstream side. Printer M2 then prints (applies) solder to board 4 and printing inspection device M3 inspects the condition of the solder printed on board 4. Subsequently, board distribution device M4 distributes board 4 to transport lane 5F on the front side or transport lane 5R on the rear side of component mounter M5. Next, component mounters M5 and M6 place the component on board 4 and hands board 4 to board distribution device M7.

Subsequently, board distribution device M7 transports board 4 on which the component is placed to mounting inspection device M8, and mounting inspection device M8 inspects the state of the component placed on board 4. Next, reflow device M9 solders the component to board 4 by a reflow operation. Thus, a mounting board on which a component is mounted via solder is completed on board 4. Next, board supplier and storage M10 (board storage) stores the completed mounting board in rack 6. In this way, component mounting line 1 is a production line where board 4 (work) is operated by each of devices M1 to M10 (a plurality of pieces of production equipment) in order from the upstream side to the downstream side to produce a mounting board (product).

Next, with reference to FIG. 2, a configuration of the control system of component mounting line 1 will be described. Board suppliers and storages M1 and M10 include supply controller 21, supply storage 22, supply operation unit 23, notifier 24, and communicator 25. Supply controller 21 controls supply operation unit 23 based on the board supply storage data stored by supply storage unit 22 so as to execute a board supply operation or a board storage operation. Printer M2 includes printing controller 31, printing storage 32, printing operation unit 7, display 33, notifier 34, and communicator 35. Print control unit 31 controls printing operation unit 7 based on the solder print data stored by print storage unit 32 so as to execute solder printing operation.

Printing inspection device M3 includes printing inspection controller 41, printing inspection storage 42, printing inspection operation unit 43, display 44, notifier 45, and communicator 46. Printing inspection controller 41 controls printing inspection operation unit 43 based on the printing inspection data stored by printing inspection storage 42 so as to execute the printing inspection operation. Board distribution devices M4 and M7 include distribution controller 51, distribution storage 52, distribution operation unit 53, notifier 54, and communicator 55. The distribution controller 51 controls distribution operation unit 53 based on the distribution data stored by distribution storage 52 so as to execute a board distribution operation.

Figure 2:
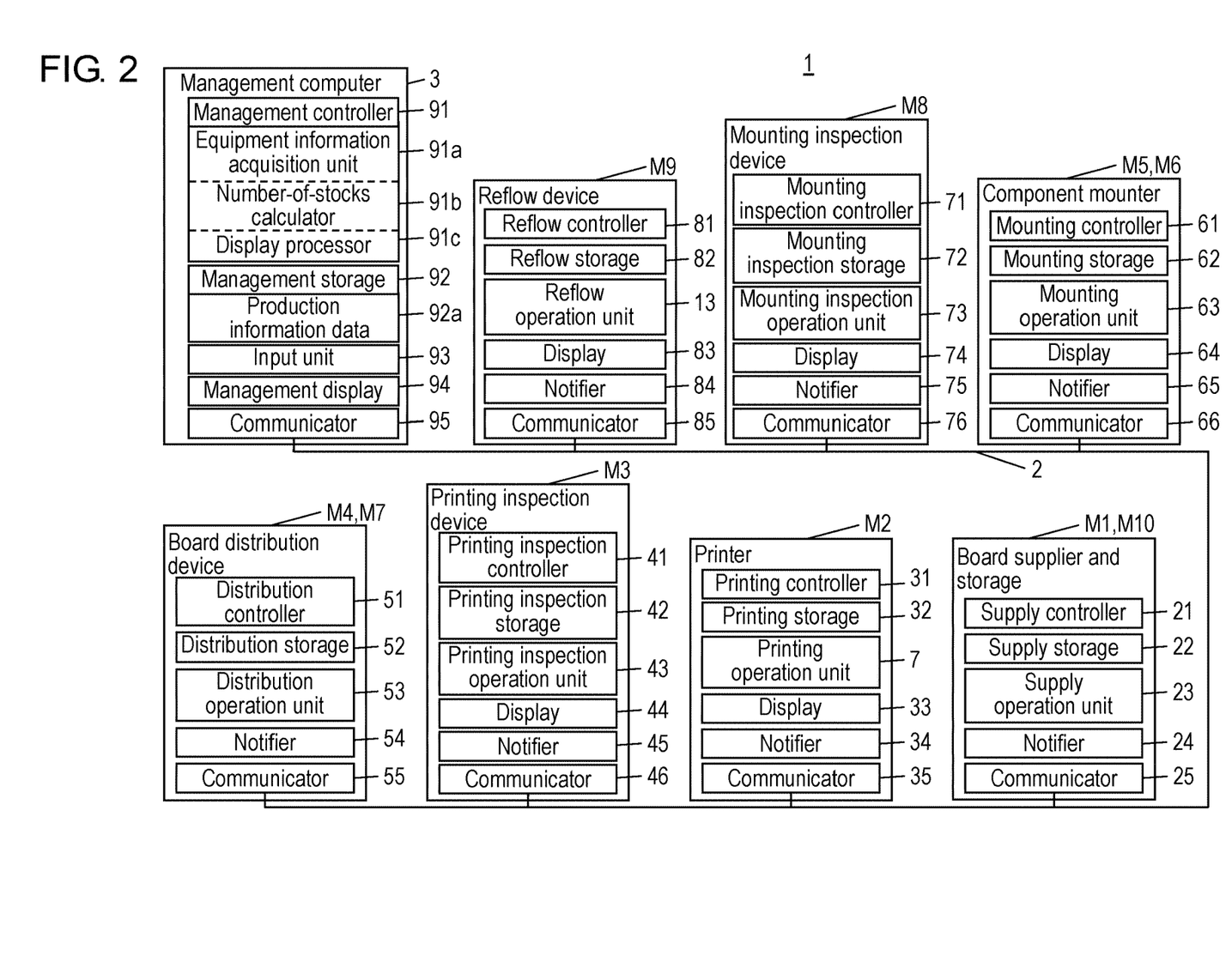
FIG. 2 is a block diagram showing a configuration of a control system of the component mounting line according to the embodiment of the present disclosure.

In FIG. 2, component mounters M5 and M6 include mounting controller 61, mounting storage 62, mounting operation unit 63, display 64, notifier 65, and communicator 66. Mounting controller 61 controls mounting operation unit 63 based on the mounting data stored by mounting storage 62 so as to execute a component placement operation. Mounting inspection device M8 includes mounting inspection controller 71, mounting inspection storage 72, mounting inspection operation unit 73, display 74, notifier 75, and communicator 76. Mounting inspection controller 71 controls mounting inspection operation unit 73 based on the mounting inspection data stored by mounting inspection storage 72 so as to execute a mounting inspection operation.

Reflow device M9 includes reflow controller 81, reflow storage 82, reflow operation unit 13, display 83, notifier 84, and communicator 85. Reflow controller 81 controls reflow operation unit 13 based on the reflow data stored by reflow storage 82 to execute a reflow operation.

In FIG. 2, displays 33, 44, 64, 74, and 83 are a display such as a liquid crystal panel and displays various kinds of information such as an operation screen. Notifiers 24, 34, 45, 54, 65, 75, and 84 are constituted by a multilayer indicator lamp having a plurality of lamps, a buzzer, and the like, and the operation status of each of devices M1 to M10 is notified to the operator by lighting lamps, operating a buzzer, or the like. Communicators 25, 35, 46, 55, 66, 76, and 85 are communication interfaces and exchange signals and data with other devices M1 to M10 and management computer 3 via communication network 2.

The controller included in each of devices M1 to M10 transmits production information Ip such as warning information Iw of each of devices M1 to M10, running status information Ir, and board ID of board 4 to be operated to management computer 3 at a predetermined timing. In addition, the controller included in each of devices M1 to M10 transmits a carry-in information Ii indicating that board 4 (word) is carried in devices M1 to M10 (production equipment) or carry-out information indicating that board 4 (work) is carried out from devices M1 to M10 (production equipment) to adjacent devices M1 to M10 and transmits the information to management computer 3 as production information Ip.

In FIG. 2, management computer 3 includes management controller 91, management storage 92, input unit 93, management display 94, and communicator 95. Input unit 93 is an input device such as a keyboard, a touch panel, a mouse, and the like and is used at the time of inputting operation commands and data. Management display 94 is a display such as a liquid crystal panel and displays various kinds of information such as an operation screen for the operation by input unit 93 and a production status screen of component mounting line 1. Communicator 95 is a communication interface and exchanges signals and data with each of devices M1 to M10 (production equipment) of component mounting line 1 via communication network 2.

Management controller 91 is a computing device such as a CPU and manages component mounting line 1 based on the information stored by management storage 92. Management controller 91 includes equipment information acquisition unit 91a, number-of-stocks calculator 91b, and display processor 91c as internal processing functions. Management storage 92 is a storage device and stores production information data 92a and the like.

In FIG. 2, equipment information acquisition unit 91a acquires production information Ip from each of devices M1 to M10 (production equipment) constituting component mounting line 1 via communicator 95 and stores the information in management storage 92 as production information data 92a. In production information Ip, equipment name In, running status information Ir, carry-in information Ii, carry-out information Io, warning information Iw of each of devices M1 to M10, product information Im of board 4 to be operated by each of devices M1 to M10, and board ID of board 4 in each of devices M1 to M10 are included.

Number-of-stocks calculator 91b calculates number-of-stocks N of board 4 (work) in devices M1 to M10 (production equipment) based on at least one of carry-in information Ii and carry-out information Io. For example, in a case where carry-in information Ii and carry-out information Io of one of devices M1 to M10 are included in production information Ip, number-of-stocks calculator 91b calculates number-of-stocks N of one of devices M1 to M10 from the difference between the number of boards 4 carried in one of devices M1 to M10 and the number of boards 4 carried out from one of devices M1 to M10.

In addition, in a case where carry-out information Io of devices M1 to M10 on the upstream side of one of devices M1 to M10 and carry-in information Ii of devices M1 to M10 on the downstream side of one of devices M1 to M10 are included in production information Ip, number-of-stocks calculator 91b calculates number-of-stocks N of one of devices M1 to M10 from the difference between the number of boards 4 carried out from devices M1 to M10 on the upstream side and the number of boards 4 carried in on devices M1 to M10 on the downstream side.

Based on the information input from production information data 92a and input unit 93 (input device), display processor 91c creates a production status screen indicating the production status of component mounting line 1 (production line) to be described later and displays the screen on management display 94. That is, management display 94 is a display that displays the production status of component mounting line 1 (production line). Then, management computer 3 is a production management device that manages the production status of component mounting line 1 (production line) where board 4 (work) is operated by a plurality of devices M1 to M10 (production equipment) in order, and a mounting board (product) is produced.

Figure 3:
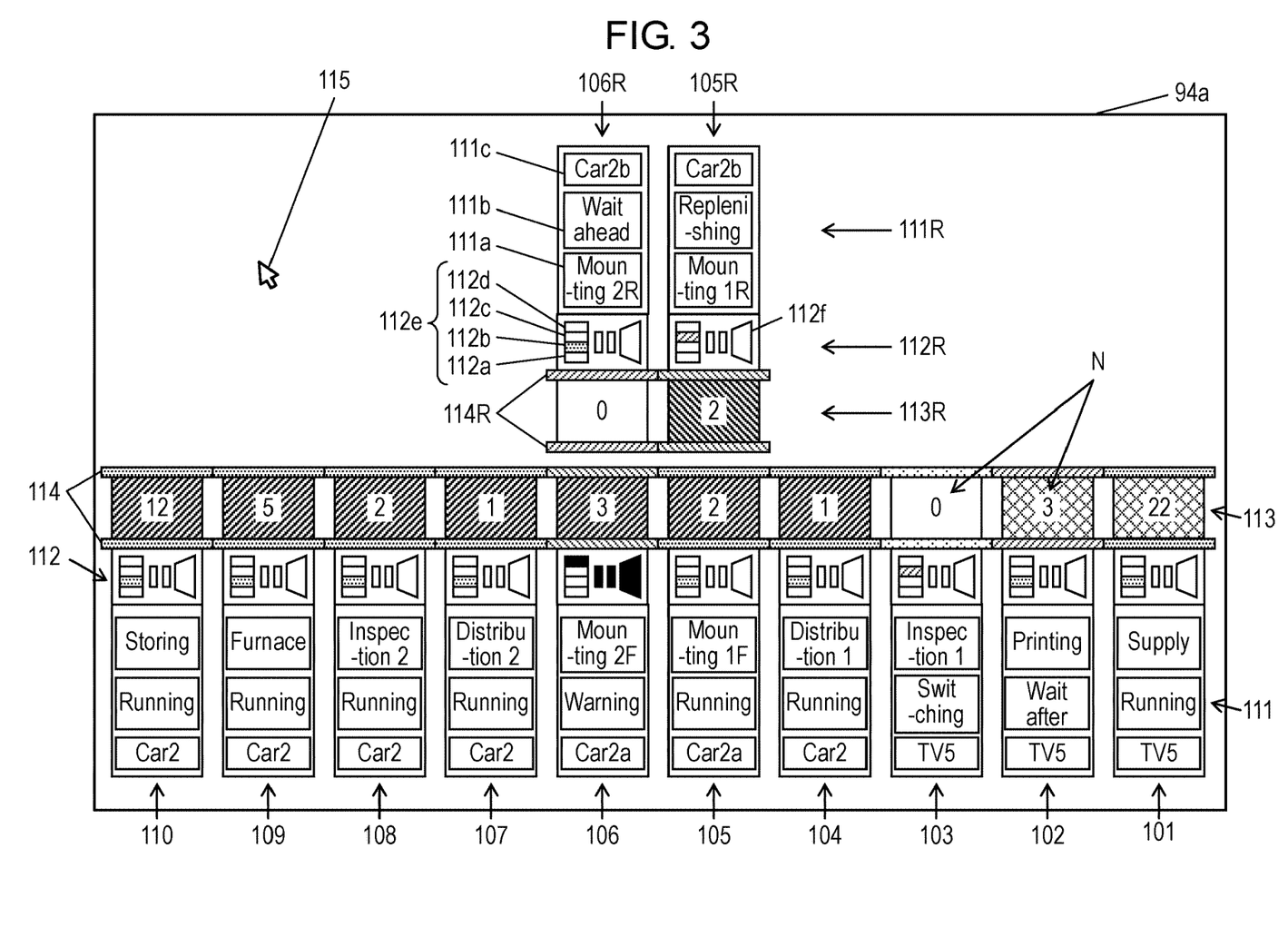
FIG. 3 is a diagram showing an example of a production status screen displayed on a display included in a management computer according to the embodiment of the present disclosure.

Next, with reference to FIGS. 3 to 5, the production status screen created by display processor 91c will be described. In FIG. 3, on screen 94a of management display 94, a production status screen showing the production status of component mounting line 1 is displayed. On the lower part of screen 94a, production equipment sections 101 to 110 for respectively displaying the production status of board supplier and storage M1, printer M2, printing inspection device M3, board distribution device M4, component mounter M5, component mounter M6, board distribution device M7, mounting inspection device M8, reflow device M9, and board supplier and storage M10 are displayed in order from the right according to the production order.

In each of production equipment sections 101 to 110, equipment information section 111, warning information section 112, and work information section 113 are stacked and displayed in order from the bottom to the top. In addition, lane information section 114 is displayed with work information section 113 vertically sandwiched therebetween. In this way, management display 94 (display) displays a plurality of equipment information sections 111, warning information sections 112, work information sections 113, and lane information sections 114 in order according to a production order corresponding to each of devices M1 to M10 (production equipment) by display processor 91c.

Production equipment sections 105 and 106 of component mounters M5 and M6 shows the production status of the operation positions on the front side. Above production equipment sections 105 and 106 of component mounters M5 and M6, production equipment sections 105R and 106R showing the production status of the operation positions on the rear side are displayed. Work information section 113R, warning information section 112R, and equipment information section 111R are respectively stacked and displayed in order from the bottom to the top in the production equipment sections 105R and 106R. In addition, lane information section 114R is displayed with work information section 113R vertically sandwiched therebetween.

In this way, in a case where devices M1 to M10 (production equipment) have a plurality of operation positions, management display 94 (display) displays a plurality of equipment information sections 111 and 111R, warning information sections 112 and 112R, work information sections 113 and 113R, and lane information sections 114 and 114R corresponding to devices M1 to M10 (production equipment) having a plurality of operation positions by display processor 91c.

In FIG. 3, equipment information sections 111 and 111R include "equipment name" column 111a for displaying equipment name In of each of devices M1 to M10, "running status" column 111b for displaying running status information Ir, and "product information" column 111c for displaying product information Im. In this example, equipment name In is displayed in abbreviation in "equipment name" column 111a, and running status information Ir is displayed in abbreviation in "running status" column 111b.

In this way, management display 94 (display) displays the equipment information such as equipment name In, running status information Ir, and product information Im of devices M1 to M10 (production equipment) in corresponding equipment information sections 111 and 111R by display processor 91c. In "running status" column 111b, the running status information of devices M1 to M10 (production equipment) based on warning information Iw may be displayed. That is, management display 94 (display) may display the running status information based on warning information Iw in corresponding equipment information sections 111 and 111R as the equipment information by display processor 91c.

In warning information sections 112 and 112R, figures imitating the multilayer indicator light and the buzzer included in each of devices M1 to M10 are displayed. That is, in each of warning information sections 112 and 112R, "multilayer indicator lamp" column 112e in which four lamps 112a to 112d are stacked in order from the bottom to the top and "buzzer" column 112f imitating the buzzer are displayed. In "multilayer indicator light" column 112e, colors are displayed on lamps 112a to 112d in conjunction with the lamp lit by the multilayer indicator lamp of each of devices M1 to M10.

For example, in lamp 112b, running status information Ir is "running", "waiting for a previous step (wait ahead)", "waiting for a subsequent step (wait after)", or the like, and in case where devices M1 to M10 are running normally, green is displayed. In lamp 112c, running status information Ir is "switching a product to be operated (switching)", "waiting for component replenishment, replenishing component (replenishing)", or the like, and in a case where the operation in devices M1 to M10 temporarily stop, yellow is displayed. In lamp 112d, running status information Ir is "trouble stop (warning)" or the like, and in a case where the operator needs to recover devices M1 to M10, red is displayed.

In "buzzer" column 112f, in a case where the buzzer is operating (ringing) in conjunction with the buzzer included in each of devices M1 to M10, colors are displayed. For example, trouble stop due to a suction error that the suction nozzle cannot adsorb a component on an operation position on the front side of component mounter M6 occurs, and the buzzer is activated to inform the operator. Therefore, red is displayed in "buzzer" column 112f corresponding to the operation position on the front side of component mounter M6. In this way, management display 94 (display) displays the content of warning information Iw notified from devices M1 to M10 (production equipment) in combination with the figures and the colors in corresponding warning information sections 112 and 112R by display processor 91c.

In FIG. 3, in work information sections 113 and 113R, number-of-stocks N of board 4 (work) in each of devices M1 to M10 (production equipment) is displayed. In addition, the same color is displayed in work information sections 113 and 113R corresponding to devices M1 to M10 (production equipment) of which board 4 (work) has the same product information Im. For example, board supplier and storage M1 and printer M2 have board 4 of product information Im "TV5", and the same color (hatched with diagonal grid in FIG. 3) is displayed in work information section 113 corresponding to board supplier and storage M1 and work information section 113 corresponding to printer M2.

In component mounters M5 and M6, the mounting board of different product information Im is produced by changing the components placed on board 4 in the operation positions on the front side and the rear side. That is, in the operation positions on the front side of component mounters M5 and M6, a component for a mounting board whose product information Im is "Car 2a" is placed on board 4, and in the operation positions on the rear side of component mounters M5 and M6, a component for a mounting board whose product information Im is "Car 2b" is placed on board 4. "Car 2" is displayed in "product information" column 111c corresponding to board distribution device M4, board distribution device M7, mounting inspection device M8, reflow device M9, and board supplier and storage M10 which operate with respect to board 4 whose product information Im is "Car 2a" and "Car 2b".

In FIG. 3, for convenience, the same color (in FIG. 3, hatched with diagonally downward sloping lines to the left) is displayed in work information section 113 corresponding to the operation positions on the front side of board distribution device M4, board distribution device M7, mounting inspection device M8, reflow device M9, board supplier and storage M10, and component mounters M5 and M6. Then, a color (in FIG. 3, hatched with diagonally downward sloping lines to the right) different from work information section 113 corresponding to the operation positions on the front side of component mounters M5 and M6 is displayed in work information section 113R corresponding to the operation positions on the rear side of component mounters M5 and M6.

In this way, management display 94 (display) displays number-of-stocks N of board 4 (work) in devices M1 to M10 (production equipment) in corresponding work information sections 113 and 113R by display processor 91c. Furthermore, management display 94 (display) displays the same color in work information sections 113 and 113R corresponding to devices M1 to M10 (production equipment) of which board 4 (work) has the same product information Im by display processor 91c.

In FIG. 3, in lane information sections 114 and 114R, the colors corresponding to the running status of transport lanes 5, 5F, and 5R transporting board 4 (work) in devices M1 to M10 (production equipment) to be included in running status information Ir are displayed. For example, green (in FIG. 3, hatched with dots) is displayed in lane information section 114 corresponding to the front side of board supplier and storage M1, board distribution device M4, and component mounter M5 in which transport lanes 5 and 5F is running, board distribution device M7, mounting inspection device M8, reflow device M9, and board supplier and storage M10.

Running status information Ir is "wait for previous step (wait ahead)" and "wait for subsequent step (wait after), and yellow (in FIG. 3, hatched with diagonally downward sloping lines to the left) is displayed in lane information sections 114 and 114R corresponding to the rear side of printer M2 and component mounter M6 in which transport lanes 5 and 5R temporarily stop. Running status information Ir is "waiting for component replenishment, replenishing component (replenishing)" "trouble stop (warning)", and pink (in FIG. 3, hatched with diagonally downward sloping lines to the right) is displayed in lane information sections 114 and 114R corresponding to the rear side of component mounter M5 in which transport lanes 5F and 5R are stopped until a recovery operation by the operator ends and the front side of component mounter M6.

Running status information Ir is "switching a product to be operated (switching)", and blue (hatched with diagonal grid in FIG. 3) is displayed in lane information section 114 corresponding to printing inspection device M3 in which transport lane 5 stops until product switching from "Car 2" to "TV 5" ends. In this way, management display 94 (display) displays the color corresponding to the running status of the transport lanes 5, 5F, and 5R transporting board 4 (work) in devices M1 to M10 (production equipment) to be included in running status information Ir in lane information sections 114 and 114R by display processor 91c. The running status of transport lanes 5, 5F, and 5R and the colors to be displayed in lane information sections 114 and 114R are not limited to the above example and may be freely set.

In FIG. 3, on screen 94a of management display 94, pointer 115 that moves in screen 94a in conjunction with the operation of the input device such as a mouse of input unit 93 is displayed. FIG. 4 shows a state where pointer 115 is on work information section 113 corresponding to reflow device M9 on screen 94a of management display 94. When pointer 115 is superimposed on work information sections 113 and 113R, identification information frame 116 is displayed. In identification information frame 116, board IDs (identification information) of boards 4 (work) in devices M1 to M10 (production equipment) corresponding to work information sections 113 and 113R on which pointer 115 is superimposed is displayed.

Figure 4:
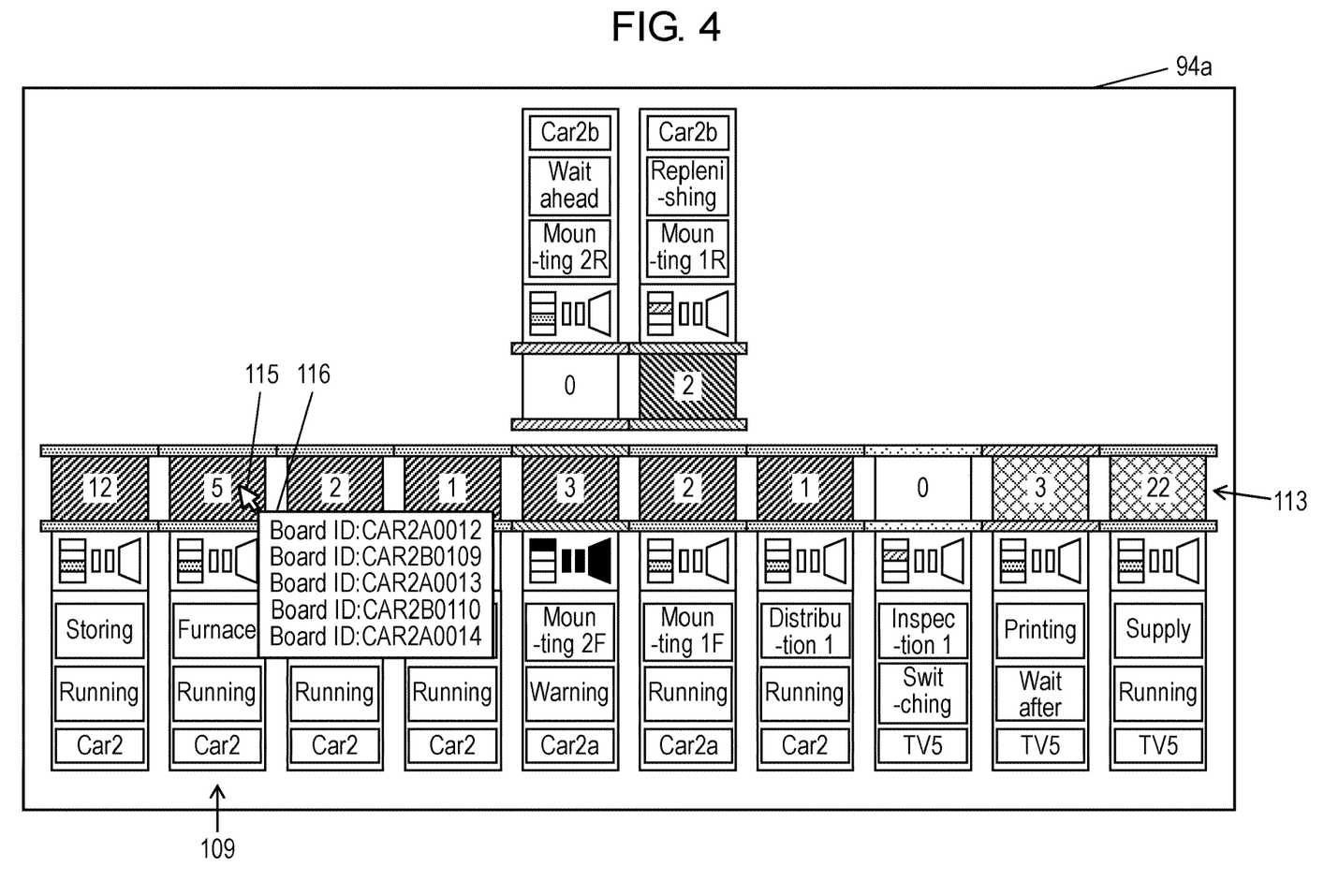
FIG. 4 is a diagram showing a state in which a pointer is superimposed on a work information section on the production status screen displayed on the display included in the management computer according to the embodiment of the present disclosure.

In FIG. 4, in identification information frame 116, board IDs of five boards 4 in reflow device M9 are displayed. In this way, management display 94 (display) displays pointer 115 linked to the input device by display processor 91c and displays board IDs (identification information) of boards 4 (work) in devices M1 to M10 (production equipment) corresponding to work information sections 113 and 113R on which pointer 115 is superimposed when pointer 115 is superimposed on work information sections 113 and 113R.

Figure 5:
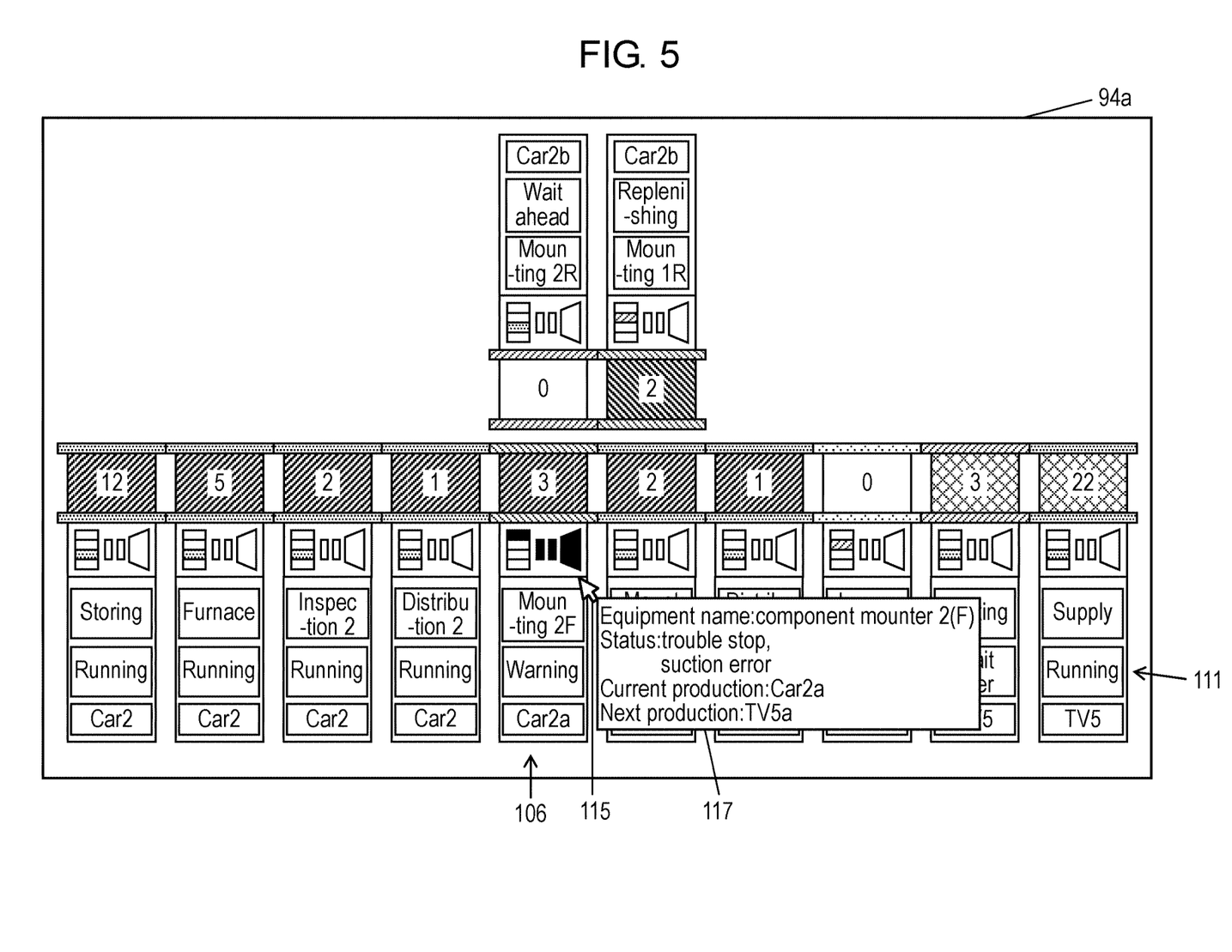
FIG. 5 is a diagram showing a state where the pointer is superimposed on an equipment information section in the production status screen displayed on the display included in the management computer according to the embodiment of the present disclosure.

FIG. 5 shows a state where pointer 115 is on equipment information section 111 corresponding to the front side of component mounter M6 on screen 94a of management display 94. When pointer 115 is superimposed on equipment information sections 111 and 111R, equipment information frame 117 is displayed. In equipment information frame 117, equipment information of devices M1 to M10 (production equipment) corresponding to equipment information sections 111 and 111R on which pointer 115 is superimposed is displayed.

In FIG. 5, equipment name In ("equipment name: component mounter 2(F)"), running status information Ir ("status: trouble stop, suction error"), product information Im ("current production: Car 2a", "next production: TV 5a") are displayed in equipment information frame 117 as the equipment information of the front side of component mounter M6. In this way, management display 94 (display) displays pointer 115 linked to the input device and displays the equipment information of devices M1 to M10 (production equipment) corresponding to equipment information sections 111 and 111R on which pointer 115 is superimposed when pointer 115 is superimposed on equipment information sections 111 and 111R by display processor 91c.

Next, a production status display method by management computer 3 (production management device) which displays the production status of component mounting line 1 (production line) will be described along the flow of FIG. 6. First, equipment information acquisition unit 91a acquires production information Ip from each of devices M1 to M10 (production equipment) of component mounting line 1 (ST1: equipment information acquisition step). Acquired production information Ip is stored in management storage 92 as production information data 92a. Subsequently, number-of-stocks calculator 91b calculates number-of-stocks N of board 4 (work) in devices M1 to M10 (production equipment) based on at least one of carry-in information Ii and carry-out information Io to be included in production information Ip (ST 2: number-of-stocks calculation step).

Next, display processor 91c causes management display 94 to display number-of-stocks N of board 4 (work) in devices M1 to M10 (production equipment) corresponding to work information sections 113 and 113R (ST 3: number-of-stocks display step). In a case where number-of-stocks N of board 4 in devices M1 to M10 is included in production information Ip transmitted from devices M1 to M10, number-of-stocks N is used for number-of-stocks N to be displayed in work information sections 113 and 113R, and in a case where number-of-stocks N of board 4 is not included, number-of-stocks N calculated in the number-of-stocks calculation step (ST 2) is used.

Figure 6:
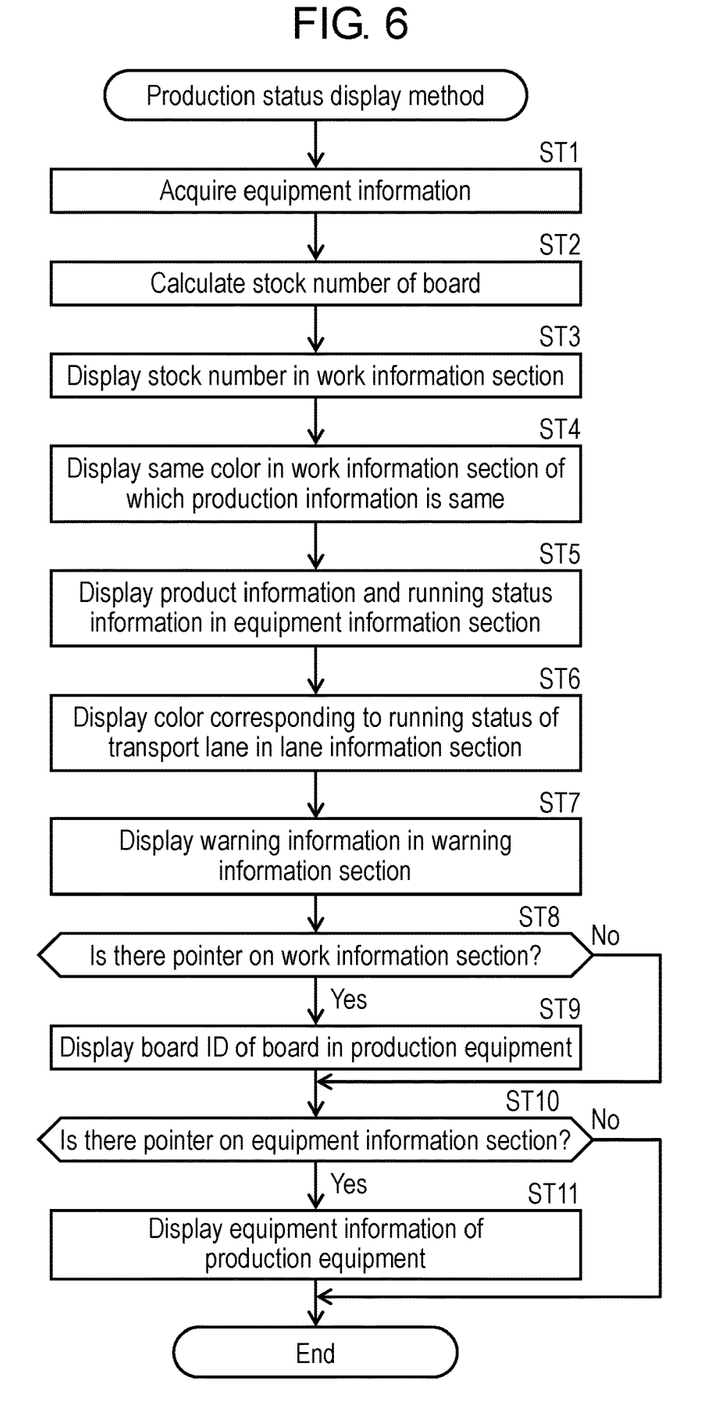
FIG. 6 is a flowchart showing a production status display method by the management computer according to the embodiment of the present disclosure.

In FIG. 6, next, display processor 91c causes management display 94 to display the same color in work information sections 113 and 113R corresponding to devices M1 to M10 (production equipment) of which board 4 (work) has the same product information Im of board 4 (work) to be included in production information Ip (ST 4: work color display step). Next, display processor 91c causes management display 94 to display product information Im and running status information Ir to be included in production information Ip in corresponding equipment information sections 111 and 111R as the equipment information (ST 5: equipment information display step).

Next, display processor 91c causes management display 94 to display the color corresponding to the running status of transport lanes 5, 5F, and 5R to be included in running status information Ir in lane information sections 114 and 114R (ST 6: lane color display step). Next, display processor 91c causes management display 94 to display the content of warning information Iw notified from corresponding devices M1 to M10 (production equipment) in combination with the figures and colors in warning information sections 112 and 112R (ST 7: warning display step).

In FIG. 6, next, display processor 91c causes management display 94 to display pointer 115 linked to the input device and determines whether or not pointer 115 is superimposed on work information sections 113 and 113R (ST 8). When pointer 115 is superimposed on work information sections 113 and 113R (Yes in ST 8), display processor 91c causes management display 94 to display board ID (identification information) of board 4 (work) in devices M1 to M10 (production equipment) corresponding to work information sections 113 and 113R on which pointer 115 is superimposed in identification information frame 116 (ST 9: identification information display step).

In a case where pointer 115 is not on work information sections 113 and 113R (No in ST 8) or after board ID (identification information) is displayed in the identification information display step (ST 9), next, display processor 91c causes management display 94 to display pointer 115 linked to the input device and determines whether or not pointer 115 is superimposed on equipment information sections 111 and 111R (ST 10). When pointer 115 is superimposed on equipment information section 111, 111R (Yes in ST 10), the equipment information of devices M1 to M10 (production equipment) corresponding to equipment information sections 111 and 111R on which pointer 115 is superimposed is displayed in equipment information frame 117 (ST 11: equipment information frame display step).

The equipment information acquisition step (ST 1) is executed at the timing when production information Ip is transmitted from devices M1 to M10 due to a change in the production status, such as start/end of operation on board 4, start/end of carry-in/carry-out of board 4, start/end of switching of a product to be operated, occurrence/end of component replenishment, occurrence/end of trouble stop in each of devices M1 to M10 of component mounting line 1. Alternatively, when a predetermined time has elapsed since collection of previous production information Ip, equipment information acquisition unit 91a issues a transmission command to each of devices M1 to M10 to acquire production information Ip.

Then, when there is a change in the production status in component mounting line 1 (production line), the number-of-stocks display step (ST 3), the work color display step (ST 4), the equipment information display step (ST 5), the lane color display step (ST 6), and the warning display step (ST 7) are executed according to the change in the production status. Alternatively, when the operator operates the input device and pointer 115 is superimposed on work information sections 113 and 113R or equipment information sections 111 and 111R, the identification information display step (ST 9) or the equipment information frame display step (ST 11) is executed.

In this way, the number-of-stocks display step (ST 3), the work color display step (ST 4), the equipment information display step (ST 5), the lane color display step (ST 6), the warning display step (ST 7), the identification information display step (ST 9), and the equipment information frame display step (ST 11) are display steps for displaying the production status of component mounting line 1 (production line) on management display 94 (display).

As described above, management computer 3 (equipment information acquisition unit) of the present embodiment includes equipment information acquisition unit 91a that acquires production information Ip from each of the plurality of pieces of production equipment (devices M1 to M10) and a display (management display 94) that displays the production status of production line (component mounting line 1) and manages the production status of the production line where a work (board 4) is operated with a plurality of pieces of production equipment in order to produce a product (mounting board). Then, the display displays a plurality of equipment information sections 111 and 111R respectively displaying the equipment information of a plurality of pieces of production equipment in order according to the production order and further displays number-of-stocks N of the work in each of the plurality of pieces of production equipment in each of the plurality of work information sections 113 and 113R to be displayed corresponding to each of the plurality of pieces of production equipment. As a result, the operator may intuitively grasp the production status of the production line.

In addition, as described above, management computer 3 (equipment information acquisition unit) of the present embodiment includes equipment information acquisition unit 91a that acquires production information Ip from individual piece of production equipment (devices M1 to M10) and a display (management display 94) that displays the production status of production line (component mounting line 1) and manages the production status of the production line where a work (board 4) is operated with a plurality of pieces of production equipment in order to produce a product (mounting board). Then, the display displays the plurality of equipment information sections 111 and 111R for displaying the equipment information of the production equipment in order according to the production order and further displays warning information Iw notified from the production equipment in a plurality of warning information sections 112 and 112R. As a result, the operator may intuitively grasp the production status of the production line.

In the above description, as a production line, component mounting line 1 where printer M2 that applies solder to board 4 (work), component mounters M5 and M6 that place a component on board 4 (work) applied with solder, and reflow device M9 that heat board 4 (work) on which the component is placed to solidifying the solder are included and a mounting board (product) is produced by mounting the component on board 4 (work) via the solder is used, but the production line of the present embodiment is not limited to component mounting line 1. For example, as the production line, an assembly line that assembles home appliances and a food processing line that food-processed products are manufactured may be used.

The production management device and the production status display method of the present disclosure enable the operator to intuitively grasp the production status of the production line and is useful in a manufacturing field where a production operation is performed by production equipment.

What is claimed is:

1. A production management device for managing a production status of a production line for producing a product by operating a work with a plurality of pieces of production equipment in order, the device comprising:

an equipment information acquisition unit that acquires production information from each of the plurality of pieces of production equipment; and a display that displays a production status of the production line, wherein the display displays a plurality of equipment information sections that display respective pieces of equipment information of the plurality of pieces of production equipment in order according to a production order and further displays the number of stocks of the work in a corresponding one of the plurality of pieces of production equipment in each of a plurality of work information sections to be respectively displayed for the plurality of pieces of production equipment, wherein the production information to be acquired includes at least one of carry-in information indicating that a work is carried in the plurality of pieces of production equipment and carry-out information indicating that a work is carried out from the plurality of pieces of production equipment, and the device further comprises a number-of-stocks calculator that calculates the number of stocks based on at least one of the carry-in information and the carry-out information, wherein the production information to be acquired includes product information of a work to be operated with the plurality of pieces of production equipment, and the display displays the product information in the plurality of corresponding equipment information sections as the equipment information, and wherein the display displays the same color in the work information sections corresponding to pieces of production equipment of which work has the same product information.

2. A production status display method for displaying a production status of a production line for producing a product by operating a work with a plurality of pieces of production equipment in order, the method comprising:

an equipment information acquisition step of acquiring production information from each of the plurality of pieces of production equipment, the production information including product information of the work; and a display step of displaying a plurality of equipment information sections that display respective pieces of equipment information of the plurality of pieces of production equipment in order according to a production order and further displaying the number of stocks of the work in each of the plurality of pieces of production equipment in a corresponding one of a plurality of work information sections to be respectively displayed for the plurality of pieces of production equipment on a display, wherein, in the display step, the same color is displayed in work information sections corresponding to pieces of production equipment of which work has the same product information.

* * * * *